United States Patent [19]

Maikis

[11] Patent Number: 5,174,106
[45] Date of Patent: Dec. 29, 1992

[54] SECONDARY IGNITION SYSTEM

[75] Inventor: Kevin J. Maikis, Chandler, Ariz.

[73] Assignee: Talley Defense Systems, Inc., Mesa, Ariz.

[21] Appl. No.: 573,100

[22] Filed: Aug. 24, 1990

[51] Int. Cl.[5] .......................... F02C 7/264; F02C 7/272
[52] U.S. Cl. ................................ 60/39.06; 60/39.142; 60/39.823
[58] Field of Search ........... 60/39.141, 39.142, 39.821, 60/39.823, 256, 39.06; 102/202

[56] References Cited

U.S. PATENT DOCUMENTS

| | | | |
|---|---|---|---|
| 2,368,179 | 1/1945 | Turpin | 158/73 |
| 2,959,001 | 11/1960 | Porter | 60/256 |
| 2,982,095 | 5/1961 | Campbell | 60/39.141 |
| 3,151,447 | 10/1964 | Bornstein | 60/39.823 |
| 3,217,489 | 11/1965 | Thurston et al. | 60/35.6 |
| 3,295,444 | 1/1967 | Cushing et al. | 102/7.2 |
| 3,319,130 | 5/1967 | Betteridge | 317/87 |
| 3,327,473 | 6/1967 | Smith | 60/39.31 |
| 3,332,353 | 7/1967 | Burkhardt et al. | 102/202 |
| 3,355,885 | 12/1967 | Toone | 60/39.82 |
| 3,533,233 | 10/1970 | Fiedler et al. | 60/39.82 |
| 3,558,285 | 1/1971 | Ciccone et al. | 23/281 |
| 3,798,900 | 3/1974 | Peterson | 60/39.14 |
| 4,161,102 | 7/1979 | Jasas et al. | 60/39.14 |
| 4,495,866 | 1/1985 | Brede et al. | 102/202 |

Primary Examiner—Louis J. Casaregola
Attorney, Agent, or Firm—Pennie & Edmonds

[57] ABSTRACT

An apparatus and method for igniting a secondary pyrotechnic charge is provided, which uses hot gases produced by a first generating means to effect the secondary ignition.

The hot gases from the heat generating means are directed through a heat transfer member in a second generating means, and heat from the gases is transferred to the secondary pyrotechnic charge, which is associated with the heat transfer member. Once ignited, the secondary charge provides flames and hot gases to effect the purpose of the application at hand, e.g., jet engine burner ignition.

37 Claims, 3 Drawing Sheets

SECONDARY IGNITION SYSTEM

FIELD OF THE INVENTION

The present invention relates to devices for the initiation of turbine movement and burner operation in jet engines.

BACKGROUND OF THE INVENTION

Jet engines generally are comprised of several basic components. A compressor provides compressed air to a burner, where the air is mixed with fuel and the resulting mixture is combusted. The heated combustion product is expanded through a turbine to power the compressor, and is then exhausted out the nozzle of the jet.

In order to initiate this process, it is usually necessary to begin rotation of the turbine prior to ignition of the burner, so that the flow from the burner does not have to overcome the resistance of a stationary turbine. Two events are therefore required: initiation of turbine rotation, and ignition of the burner. Turbine rotation is normally initiated by using a pyrotechnic starter cartridge which, when ignited, generates a flow of gas that impinges on either the turbine or compressor to get the system turning to its idle speed. Once idle speed has been attained, prior art systems have employed an additional pyrotechnic device to initiate the operation of the burner. This second pyrotechnic device usually must provide a relatively lengthy pyrotechnic event (from 2 to 8 seconds) to ensure burner ignition. A spark or similar ignition event of short duration is usually insufficient.

Because burner ignition should occur when the turbine rotation reaches idle speed, the two pyrotechnic events must be coordinated. In prior art devices employing two separate pyrotechnic elements, electronic pulses coordinated by a logic system are used to begin each pyrotechnic event. However, the use of two independent devices, and a complicated electronic logic system for sequencing their ignition, makes the overall system complex and prone to malfunction.

SUMMARY OF THE INVENTION

It is therefore an object of the present invention to provide an ignition system which reduces the complexity, and hence the susceptibility to failure, of present systems.

It is a further object of the invention to provide a system which requires only a single triggering event to initiate the start-up of the engine.

It is yet another object of the invention to provide a system which avoids the necessity for an electronic logic controller to coordinate the initiation of turbine rotation and burner combustion.

These and other objects which will be apparent to one skilled in the art are accomplished by the present invention, which provides a system directly linking a first generating means for initiating turbine rotation to a second generating means for igniting the burner, by arranging for ignition of the second device to be triggered by the flow of hot gases from the previously ignited first device.

In particular, a portion of the hot gases from the first generating means is bled off and directed to the second generating means. The second generating means has a heat transfer member through which the gas is forced, and this member passes through a pyrotechnic charge in the second device. The heat from the gases is transferred through the walls of the tube to the pyrotechnic charge, in order to ignite the charge. The pyrotechnic charge is a ballistic grain material, and is located close enough to the member to assure sufficient heat transfer for ignition. The ignited charge produces flames and hot gases which initiate combustion in the burner.

An alternative to direct ignition of the charge by the heated member is to provide a primer ignition material which ignites more readily than the charge. The primer is associated with both the heat transfer member and the charge so that it is ignited by the heat of the member, after which the charge is ignited by the burning primer.

By selecting an appropriate combination of the various components of the invention, the reliability of ignition can be assured and the burner ignition can be coordinated with the initial ignition of the first device and therefore with the initiation of turbine rotation. The characteristics of each component of the system contribute to the ability of the system to ignite the pyrotechnic material in the second device, and affect the timing of that event. A pyrotechnic charge material which ignites at a higher temperature would require a hotter tube for ignition. The heat conduction properties of the gas transfer lines which carry gas from the first to the second generating means will affect the temperature of the gas reaching the second means, and therefore the effectiveness and speed of ignition. Similarly, the initial temperature and mass flow of the gas, which are a function of the first generating means, will affect its capacity for heating the transfer member of the second means. By adjusting each of these components the operation of the system may be tailored to suit a given application.

It will be apparent to one skilled in the art that the present invention, although described with regard to a jet engine ignition application, may be used in any setting where it would be desirable and feasible to ignite a pyrotechnic device using a fluid flow. The jet engine starter system is accordingly meant only as an illustration of, and not a limitation upon, the scope and nature of applicant's invention.

DETAILED DESCRIPTION OF THE PREFERRED EMBODIMENTS

Figure 1:
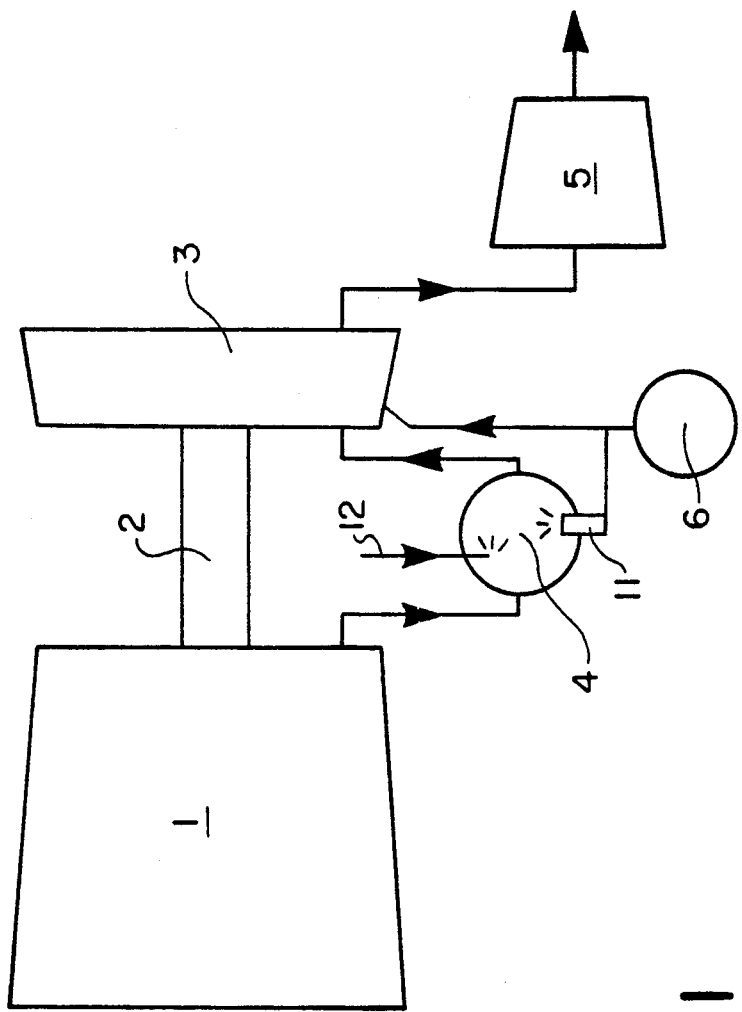
FIG. 1 is a schematic diagram showing a typical jet engine system as modified according to the invention.

As shown by FIG. 1, the basic components of a jet engine system comprise a compressor 1 linked by a shaft 2 to a turbine 3, and a nozzle 5. Compressor 1 feeds compressed air to burner 4, where the air is mixed with fuel and combusted. The air and fuel mixture expands when combusted, and as it expands it is forced through turbine 3 and then out nozzle 5. Turbine 3 powers compressor 1 through shaft 2. Thrust is provided by the exhaust of the expanding combustion product through nozzle 5.

In order to initiate operation of the engine, a gas generator 6 is used to begin rotation of turbine 3 and then ignite burner 4. Gas generator 6 is preferably a device housing a ballistic grain which produces a high temperature gas when ignited. The generator may be triggered by a simple electronic ignition event. Initiation of ignition can be controlled by any of various electronic devices, the use of which would be apparent to one skilled in the art. Once generation of gas begins, the ballistic grain combusts entirely and the resulting gas flow is forced out through the nozzle of the generator.

Turbine rotation is started by gas from generator 6 impinging on the blades of the turbine. Burner ignition is achieved by diverting a portion of the hot gases from gas generator 6, and using heat from the gases to ignite a pyrotechnic charge in a second generating means which in turn provides an extended pyrotechnic event of sufficient duration to ignite the burner. The specific construction of the starter device is described in detail below.

Figure 2:
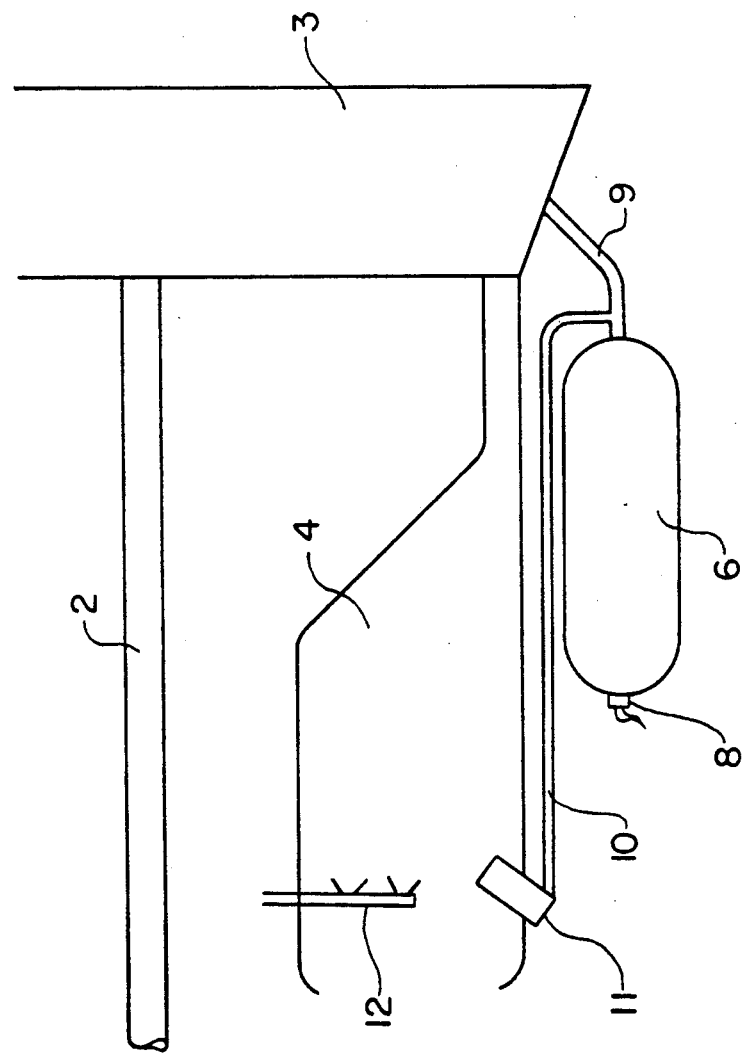
FIG. 2 is a schematic view of the components of the invention as arranged within the jet engine system.

Applicant's system for initiating the operation of, for example, a jet engine is shown in greater detail in FIG. 2. Gas generator 6 contains a propellant grain which generates a hot gas when ignited. An electrical initiator 8 is typically provided in contact with the propellant grain to ignite generator 6. It is a feature of this invention that the initiation of gas generation is the only event which has to be triggered in order to start the engine.

The gas generated by generator 6 is led through primary gas line 9 to turbine 3. The gas then impinges the blades of turbine 3 and thereby brings the turbine to a rotational idle speed. At the same time, a part of the gas released by generator 6 is led through secondary gas line 10 to a second generating means 11 at burner 4. As previously stated, heat from the gas is used to ignite a pyrotechnic charge in the second generating means, which in turn provides a flame for igniting the air and fuel mixture in burner 4. Air is provided from a compressor, and fuel is introduced at a fuel inlet 12. Turbine 3 is rotated by the expanding combustion product from burner 4, and shaft 2 is used to power a compressor by the motion of turbine 3.

Figure 3:
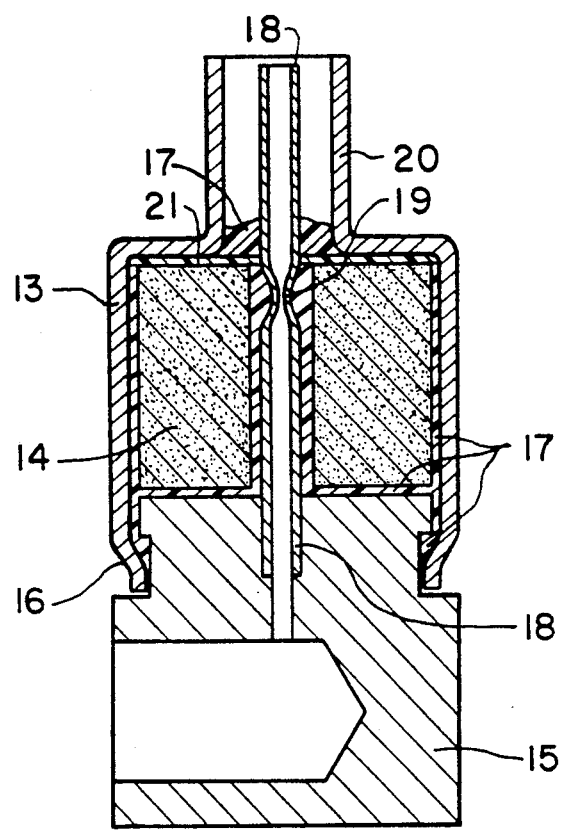
FIG. 3 is a cross-sectional view of the secondary ignition device according to a first embodiment of the invention.
Figure 4:
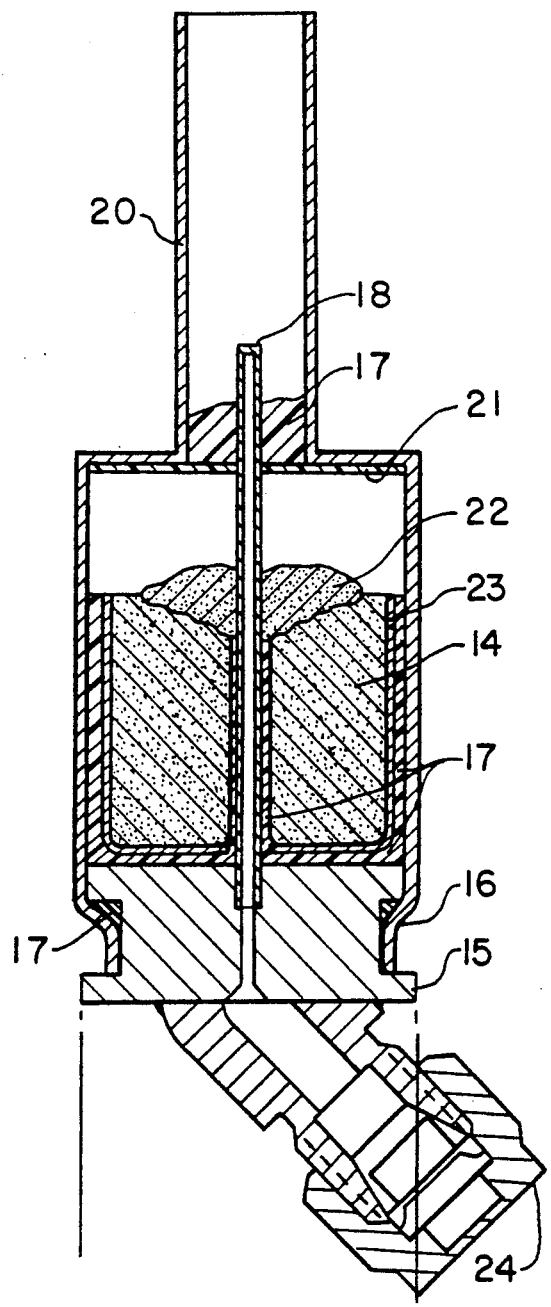
FIG. 4 is a cross-sectional view of the secondary ignition device according to a second embodiment of the invention.

FIGS. 3 and 4 show particular embodiments of the second generating means according to the invention. As shown in FIG. 3, the second generating means comprises a case 13, which contains an ignitor grain 14. The case and grain are mounted on a base 15, and held in place by a closure crimp 16 in case 13. An adhesive inhibitor sealant 17 is used between the case 13, ignitor grain 14, and base 15. Sealant 17 is typically an epoxy, which serves to stabilize the device structurally.

A heat transfer tube 18, is provided through the center of ignitor grain 14 and is adapted to receive gas from, e.g., gas generator 6 of FIGS. 1 and 2. Tube 17 is heated by the flow of hot gases, and ignites the grain 14 by transferring the heat to the grain. Further details concerning the construction of tube 18 are provided below. While it is preferred that the tube be centrally located through the pyrotechnic grain, it is only necessary that it be associated with the charge in a way which causes ignition when the tube is heated. A constricted area 19 in tube 18 may be used to create a point of particularly high temperature for igniting the grain.

Upon ignition of grain 14, the resulting flame is directed by neck portion 20 of case 13 into the burner 4, where combustion of the air and fuel mixture is thereby initiated. Neck portion 20 is preferably sealed prior to ignition by a sealant 17 and a mylar disk 21 to protect the propellant charge from the external environment, both of which are ruptured by the pyrotechnic event when the grain is ignited.

FIG. 4 shows a second generating means according to a second embodiment of the invention, which is substantially similar to that of FIG. 3, but contains certain additional variations. Most significantly, the heat transfer tube 18 is narrow and straight in the embodiment of FIG. 4. Heating is facilitated by tube 18 having a narrower flow area than the gas line from which it receives gas. This differs from the FIG. 3 embodiment, which employs a narrowed tube section to aid in heat generation. FIG. 4 also shows an ignition primer 22, which ignites more readily than ignitor grain 14 and which burns at a high enough temperature to ignite grain 14. Primer 22 is layered on top of grain 14 so that the primer is ignited by the heated tube and then causes ignition of grain Other variations depicted by FIG. 4 include the use of a cup 23 for containing the grain 14. Cup 23 is useful in the production of the ignition devices, because ignitor grain can be packed into the cup prior to assembly of the device. This allows the pyrotechnic charges to be packed prior to assembly of the devices, and stored until the time for assembly. Cup 23 is typically of a steel construction.

Finally, a fitting 24 is shown which serves to connect the hot gas source to the constriction tube. In the system shown in FIG. 2, secondary gas line 10 would be connected to fitting 24.

The ignitor grain used with the invention is preferably magnesium teflon, but any other grain having energetic combustion properties suitable for burner ignition could be used. Such suitable alternatives would include hydroxy-terminated polybutadiene (HTPB) and ammonium perchlorate-based propellant grains. The primer, if used, is preferably a granulated magnesium teflon held together by a binder.

The heat transfer tube is preferably stainless steel, while the outer case and base may be of common steel, stainless steel, or titanium if lighter weight is required.

The various features of the preferred embodiments disclosed by the foregoing description are not limited in use to the specific configurations shown. Such features may therefore be implemented, combined with other features, or omitted as required by the particular application at hand.

In any given application, the specifications of individual components of the invention may be adjusted to accomplish the objectives of turbine start-up and burner ignition. This especially requires attention to the temperature and mass flow of gas at the second generating means, because these factors determine the heat transfer to the ignitor grain and therefore the reliability of ignition. The factors affecting ignition are therefore the type of gas generator used, the mass, thickness, length, and thermal conductivity of the secondary gas line and heat transfer tube, and the energy required for ignition of the ignitor grain or primer.

EXAMPLES

The following examples are provided to illustrate possible combinations of the components of the invention and the effect of those components on the functioning of the invention. These examples are provided for the purpose of illustration only and should not be construed as limiting the invention in any manner.

The ignitor device of the present invention was tested both with and without a live ignitor grain. In tests without live grain, a thermocouple was attached to the heat transfer tube of the device to determine the temperature of the tube during gas generation.

The test set-up consisted of a gas generator, a gas line measuring 6 inches long and ⅛ inch in diameter, and the ignitor device. The ignitor included a magnesium teflon ignitor grain, an ignition primer consisting of granulated magnesium teflon coated with a binder, and a heat transfer tube measuring 0.6 inches a length having a 0.05 inch outer diameter and a wall thickness of 0.01 inches.

In the tests without live ignitor grain, the thermocouple registered a temperature of 900° F. at one second after gas generation, and a maximum of 1310° F. at 3.3 seconds after gas generation.

A live ignitor grain was tested at several different environmental temperatures. At 80° F., ignition was achieved 1.0 seconds after gas generation, and the duration of the ignitor burn was 4.7 seconds. At 145° F., ignition was again achieved 1.0 seconds after gas generation, but the ignitor burn lasted only 3.0 seconds. At −30° F., ignition occurred 2.3 seconds after gas generation, and ignitor burn lasted 5.6 seconds.

As these test results show, environmental factors can affect the performance characteristics of such an ignitor. The gas generator is a solid propellant device, and in cold operating extremes the propellant burns more slowly. While this causes a delay in the ignition of the secondary pyrotechnic device, a delay also occurs in bringing the turbine to idle speed. The system is therefore self-compensating, in that the two steps remain coordinated.

Further tests also revealed that additional variables may significantly affect the operation of the system. Higher gas temperatures at the ignitor give more reliable ignition results. The mass and thermal conductivity of components up to and including the heat transfer tube were found to affect the heat of gas reaching the ignitor grain. Thus, there is a point in any application at which substitution of a higher mass gas line or heat transfer tube, or positioning of the secondary gas line away from the generator, will result in inoperativeness of the system. Consequently, the parameters of any actual application of the present invention must be assessed, and the components of the invention selected accordingly, in order to ensure the reliable and proper functioning of the system.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

I claim:

1. A device for initiating combustion of a pyrotechnic charge, said device comprising:
   a) first generating means adapted to produce a quantity of a gaseous product at elevated temperature and pressure upon ignition of a quantity of combustible material located therein;
   b) means associated with said first generating means for igniting said combustible material at a predetermine time;
   c) second generating means operatively associated with said first generating means, said second generating means adapted to produce a quantity of combustion products comprising flames and hot gases upon ignition of a pyrotechnic charge located therein; and
   d) a heat transfer member having a first end, and a second end, a substantially solid outer wall and an open bore portion defined by said wall, said bore extending substantially through said member from said first end to said second end, said first end adapted to receive at least a portion of said gaseous product produced by said first generating means and said second end extending at least partially within said second generating means adjacent said pyrotechnic charge located therein such that, upon ignition of the combustible material in said first generating means, the elevated temperature of the glass thus produced heats the outer wall of said member while passing therethrough between said first end and said second end, which heat in turn is transferred through said wall so as to ignite said pyrotechnic charge located adjacent said member in said second generating means.

2. The device of claim 1 wherein said heat transfer member is constructed of a material having a sufficiently high coefficient of thermal conductivity to permit the transfer of heat between said gaseous product produced upon operation of said first generating means and said pyrotechnic charge located in said second generating means.

3. The device of claim 2 wherein said material is stainless steel.

4. The device of claim 2 wherein said heat transfer member is metal tube having a constricted portion in an area adjacent said pyrotechnic charge of said second generating means to facilitate the transfer of said heat between said member and said pyrotechnic charge.

5. The device of claim 2 wherein said heat transfer member passes through at least a portion of said pyrotechnic charge located within said second generating means.

6. The device of claim 5 wherein said heat transfer member extends substantially through a central portion of said pyrotechnic charge.

7. The device of claim 1 wherein said pyrotechnic charge comprises:
   a) a combustible pyrotechnic grain; and
   b) an ignition primer material located adjacent said pyrotechnic grain and adapted upon combustion due to the heat transferred through said member, to initiate combustion of said pyrotechnic grain.

8. The device of claim 7 wherein said ignition primer and said pyrotechnic grain are in contact relation within said second generating means.

9. The device of claim 7 wherein said pyrotechnic grain is comprised of a material selected from the group consisting of magnesium teflon, HTPB and ammonium-perchlorate based propellants.

10. The device of claim 7 wherein said ignition primer material is a granulated material selected from the group consisting of magnesium teflon, HTPB and ammonium-perchlorate based propellants, wherein said primer material is relatively more loosely packed within said second gas-generating means than the material of which said pyrotechnic grain is formed.

11. The device of claim 1 wherein said means for igniting said combustible material within said first generating means is an electrical initiator.

12. A device for initiating combustion of a pyrotechnic charge, said device comprising:

a) first generating means adapted to produce a quantity of a gaseous product at elevated temperature and pressure upon ignition of a quantity of combustible material located therein;

b) an electrical initiator operatively associated with said first generating means for igniting said combustible material at a predetermined time;

c) second generating means operatively associated with said first generating means, said second generating means adapted to produce a quantity of combustion products comprising flames and hot gases, upon ignition of a pyrotechnic charge located therein, said pyrotechnic charge comprising a material selected from the group consisting of magnesium teflon, HTPB and ammonium-perchlorate based propellants; and d) a heat transfer tube having a first end, a second end, a substantially solid outer wall and an open bore portion defined by said wall, said bore extending substantially through said tube from said first end to said second end, said tube constructed of a material having a sufficiently high coefficient of thermal conductivity to permit the transfer of heat through said wall between said gaseous product from said first generating means and said pyrotechnic charge located in said second generating means, said first end of said tube adapted to receive at least a portion of said gaseous product produced by said first generating means and said second end, extending through at least a portion of said pyrotechnic charge located within said second generating means such that, upon ignition of the combustible material in said first generating means, the elevated temperature of the hot gases thus produced heats the outer wall of said tube while passing therethrough between said first end and said second end, which heat in turn, is transferred through said wall so as to ignite said pyrotechnic charge located in said second generating means.

13. The device of claim 12 wherein said heat transfer tube has a constricted portion in an area adjacent said pyrotechnic charge within said second generating means to facilitate the transfer of heat between said tube and said pyrotechnic charge.

14. The device of claim 12 wherein said pyrotechnic charge comprises:

a) a combustible pyrotechnic grain; and b) an ignition primer material located adjacent said pyrotechnic grain and adapted, upon combustion due to the heat transferred through said heat transfer tube, to initiate combustion of said pyrotechnic grain.

15. A secondary ignition system for jet engines, said system comprising:

a) first generating means for initiating movement of a turbine portion of said engine, said first means adapted to produce a quantity of a gaseous product at elevated temperature and pressure upon ignition of a quantity of combustible material located therein;

b) means associated with said first generating means for igniting said combustible material at a predetermined time;

c) second generating means for igniting a burner portion of said engine, said second means operatively associated with said first means and adapted to produce a quantity of combustion products comprising flames and hot gases upon ignition of a pyrotechnic charge located therein; and d) a heat transfer member having a first end and a second end and an open bore portion extending substantially therethrough from said first end to said second end, said first end adapted to receive at least a portion of said gaseous product produced by said first generating means and said second end extending at least partially within said second generating means adjacent said pyrotechnic charge located therein such that, upon ignition of the combustible material in said first generating means, the elevated temperature of the gases thus produced heats said member, which in turn causes the ignition of said pyrotechnic charge located adjacent said member in said second generating means.

16. The system of claim 15 wherein said heat transfer member is constructed of a material having a sufficiently high coefficient of thermal conductivity to permit the transfer of heat between said gaseous product produced upon operation of said first gas generating means and said pyrotechnic charge located in said second generating means.

17. The system of claim 16 wherein said material is stainless steel.

18. The system of claim 16 wherein said heat transfer member is metal tube having a constricted portion in an area adjacent said pyrotechnic charge of said second generating means to facilitate the transfer of said heat between said member and said pyrotechnic charge.

19. The system of claim 16 wherein said heat transfer member passes through at least a portion of said pyrotechnic charge located within said second generating means.

20. The system of claim 19 wherein said heat transfer member extends substantially through a central portion of said pyrotechnic charge.

21. The system of claim 15 wherein said pyrotechnic charge comprises:

a) a combustible pyrotechnic grain; and b) an ignition primer material located adjacent said pyrotechnic grain and adapted upon combustion due to the heat transferred through said member, to initiate combustion of said pyrotechnic grain.

22. The system of claim 21 wherein said ignition primer and said pyrotechnic grain are in contact relation within said second generating means.

23. The system of claim 21 wherein said pyrotechnic grain is comprised of a material selected from the group consisting of magnesium teflon, HTPB and ammonium-perchlorate based propellants.

24. The system of claim 21 wherein said ignition primer material is a granulated material selected from the group consisting of magnesium teflon, HTPB and ammonium-perchlorate based propellants, wherein said primer material is relatively more loosely packed within said second gas-generating means than the material of which said pyrotechnic grain is formed.

25. A method for initiating combustion of a pyrotechnic charge, said method comprising:

a) igniting a quantity of combustible material located within a first generating means to produce a gaseous product at an elevated temperature and pressure;

b) directing said gaseous product completely through a heat transfer member in fluid communication with said first generating means and past a pyrotechnic charge located within a second generating means operatively associated with said first generating means such that said gaseous product remains contained entirely within said heat transfer member during its passage therethrough and is prevented from contacting said pyrotechnic charge in said second generating means, said second generating means adapted, upon ignition of said pyrotechnic charge, to produce a quantity of combustion products comprising flames and hot gases; and c) initiating combustion of said pyrotechnic charge within said second generating means solely by transferring heat from said gaseous product produced within said first generating means through a solid outer wall portion of said transfer member to said pyrotechnic charge.

26. The method of claim 25 which further comprises constricting a portion of said heat transfer member located adjacent said pyrotechnic charge to further heat said gaseous product so as to facilitate said heat transfer between said gaseous product and said pyrotechnic charge.

27. The method of claim 25 which further comprises forming said heat transfer member of a material having a sufficiently high coefficient of thermal conductivity to permit the ignition of said pyrotechnic charge at a predetermined interval following the combustion of said combustible material within said first generating means.

28. The method of claim 25 which further comprises selecting said pyrotechnic charge from the group of materials consisting of magnesium teflon, HTPB and ammonium-perchlorate based propellants.

29. A method for initiating operation of a jet engine, said method comprising:
 a) igniting a quantity of combustible material located within a first generating means to produce a gaseous product at an elevated temperature and pressure;
 b) directing a first portion of said gaseous product to a turbine or compressor of a jet engine and thereby initiating movement of said turbine or compressor in response to contact with said gaseous product, and directing a second portion of said gaseous product through a heat transfer member in fluid communication with said first generating means and past a pyrotechnic charge located within a second generating means operatively associated with said first generating means, said second generating means adapted, upon ignition of said pyrotechnic charge, to produce a quantity of combustion products comprising flames and hot gases;
 c) initiating combustion of said pyrotechnic charge within said second generating means by transferring heat from said gaseous product produced within said first generating means through said transfer member to said pyrotechnic charge; and
 d) directing the combustion products of said combustion of said pyrotechnic charge to a fuel mixture within a jet engine burner and igniting said fuel mixture in response to contact with said combustion products.

30. A device for initiating combustion of a pyrotechnic charge, said device comprising:
 a) first generating means adapted to produce a quantity of a gaseous product at elevated temperature and pressure upon ignition of a quantity of combustible material located therein;
 b) means associated with said first generating means for igniting said combustible material at a predetermined time;
 c) second generating means operatively associated with said first generating means, said second generating means adapted to produce a quantity of combustion products comprising flames and hot gases upon ignition of a pyrotechnic charge located therein; and
 d) a heat transfer tube having a first end, a second end and an open bore portion extending substantially therethrough from said first end to said second end, said tube constructed of a metal having a sufficiently high coefficient of thermal conductivity to permit the transfer of heat between said gaseous product produced upon operation of said first generating means and said pyrotechnic charge located in said second generating means, said first end of said tube adapted to receive at least a portion of said gaseous product produced by said first generating means and said second end extending at least partially within said second generating means adjacent said pyrotechnic charge located therein, said tube further having a constricted portion in an area adjacent said pyrotechnic charge of said second generating means to facilitate the transfer of said heat between said tube and said pyrotechnic charge, whereupon upon ignition of the combustible material in said first generating means, the elevated temperature of the gases thus produced heats said tube, which in turn causes the ignition of said pyrotechnic charge located adjacent said tube in said second generating means.

31. The device of claim 30 wherein said metal is stainless steel.

32. The device of claim 30 wherein said heat transfer tube passes through at least a portion of said pyrotechnic charge located within said second generating means.

33. A device for initiating combustion of a pyrotechnic charge, said device comprising:
 a) first generating means adapted to produce a quantity of a gaseous product at elevated temperature and pressure upon ignition of a quantity of combustible material located therein;
 b) means associated with said first generating means for igniting said combustible material at a predetermined time;
 c) second generating means operatively associated with said first generating means, said second generating means adapted to produce a quantity of combustion products comprising flames and hot gases upon ignition of a pyrotechnic charge located therein, said pyrotechnic charge comprising
  i) a combustible pyrotechnic grain; and
  ii) an ignition primer material located adjacent said pyrotechnic grain and adapted upon combustion due to the heat transferred through to heat transfer member, to initiate combustion of said pyrotechnic grain, said ignition primer material being a granulated material selected from the group consisting of magnesium teflon, HTPB and ammonium-perchlorate based propellants, wherein said primer material is relatively more loosely packed within said second gas-generating means than the material of which said pyrotechnic grain is formed; and
 d) said heat transfer member having a first end and a second end and a open bore portion extending substantially therethrough from said first end to said second end, said first end adapted to receive at least a portion of said gaseous product produced by said first generating means and said second end extending at least partially within said second generating means adjacent said pyrotechnic charge located therein such that, upon ignition of the combustible material in said first generating means, the elevated temperature of the gases thus produced heats said member, which in turn causes the ignition of said pyrotechnic charge located adjacent said member in said second generating means.

34. The device of claim 33 wherein said ignition primer and said pyrotechnic grain are in contact relation with said second generating means.

35. The device of claim 33 wherein said pyrotechnic grain is comprised of a material selected from the group consisting of magnesium telfon, HTPB and ammoniumperchlorate based propellants.

36. A method for initiating combustion of a pyrotechnic charge, said method comprising:
  a) igniting a quantity of combustible material located within a first generating means to produce a gaseous product at an elevated temperature and pressure;
  b) directing said gaseous product through a heat transfer member in fluid communication with said first generating means and past a pyrotechnic charge located within a second generating means operatively associated with said first generating means, wherein a portion of said heat transfer member located adjacent said pyrotechnic charge is constricted to further heat said gaseous product so as to facilitate heat transfer between said gaseous product and said pyrotechnic charge, said second generating means adapted, upon ignition of said pyrotechnic charge, to produce a quantity of combustion products comprising flames and hot gases; and
  c) initiating combustion o said pyrotechnic charge within said second generating means by transferring heat from said gaseous product produced within said first generating means through said transfer member to said pyrotechnic charge.

37. The method of claim 36 which further comprises forming said heat transfer member of a material having a sufficiently high coefficient of thermal conductivity of permit the ignition of said pyrotechnic charge at a predetermined interval following the combustion of said combustible material within said first generating means.

* * * * *